United States Patent
Li et al.

(10) Patent No.: US 8,666,443 B2
(45) Date of Patent: Mar. 4, 2014

(54) METHOD AND APPARATUS FOR MUTING A SOUNDER DEVICE

(75) Inventors: Zhongqing Li, Beijing (CN); Haibin Ke, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 991 days.

(21) Appl. No.: 12/286,048

(22) Filed: Sep. 26, 2008

(65) Prior Publication Data

US 2009/0104929 A1    Apr. 23, 2009

(30) Foreign Application Priority Data

Sep. 27, 2007    (CN) .......................... 2007 1 0175222

(51) Int. Cl.
*H04M 1/00*    (2006.01)

(52) U.S. Cl.
USPC ........ 455/550.1; 455/418; 455/419; 455/420; 455/445

(58) Field of Classification Search
USPC ........... 455/550.1, 418–420, 422.1, 403, 445, 455/564, 456.1–457, 567, 426.1, 426.2, 455/575.1, 90.3, 90.2
See application file for complete search history.

(56) References Cited

U.S. PATENT DOCUMENTS

| | | | |
|---|---|---|---|
| 5,390,341 A * | 2/1995 | Ziniel | 455/517 |
| 6,438,385 B1 * | 8/2002 | Heinonen et al. | 455/501 |
| 2004/0049779 A1 * | 3/2004 | Sjoblom et al. | 725/13 |
| 2007/0060054 A1 * | 3/2007 | Romesburg | 455/41.2 |
| 2007/0249295 A1 * | 10/2007 | Ukita et al. | 455/88 |
| 2008/0146212 A1 * | 6/2008 | Aaron | 455/419 |

FOREIGN PATENT DOCUMENTS

| | | |
|---|---|---|
| CN | 1209702 A | 3/1999 |
| EP | 1845615 A1 | 10/2007 |
| JP | 2003101666 A | 4/2003 |
| JP | 2004187191 A | 4/2004 |
| JP | 2004179862 A | 6/2004 |

* cited by examiner

*Primary Examiner* — Keith Ferguson
(74) *Attorney, Agent, or Firm* — Kinney & Lange, P.A.

(57) ABSTRACT

The present invention provides a method and apparatus for muting a sounder device, the method comprises steps of binding a network terminal with the sounder device via a network; generating a muting requirement; sending a muting signal to the sounder device via the network, the muting signal is generated based on the muting requirement; wherein the sounder device is configured to perform a muting process upon the muting signal. The method further comprises a step of sending a recovery signal to the sounder device via the network if the muting requirement becomes invalid, and the sounder device is configured to recover the status before the muting process upon the recovery signal. When it is necessary to remove unwanted background sound, all the sounder devices can be controlled via a network to perform a muting or volume-lowering process. In this way, the mobile terminal can easily and rapidly have the unwanted background sound be removed or lowered at the time of answering or making a call.

8 Claims, 2 Drawing Sheets

METHOD AND APPARATUS FOR MUTING A SOUNDER DEVICE

BACKGROUND OF THE INVENTION

1. Field of Invention

The present invention relates to the technology of muting devices in the surroundings, in particular to a method and apparatus for muting a sounder device.

2. Description of Prior Art

With the increasing popularity of mobile phone, it is common for a person to carry several mobile phones along with him/her. For example, the simultaneous use of a GSM (Global System of Mobile Communication) phone and a PHS (Personal Handset System) is popular in most office area, since the PHS can only be used within the office area, and the GSM phone is for use outside the office area. To meet different requirements, the two types of phones are usually carried together. Also, considering fees and signal strength, the PHS having lower fees is often used in the urban area where the signal strength is higher, while the GSM mobile phone is used at the time of traveling outside the urban area or roaming to other cities, where the PHS has poor quality of communication signal and disability of roaming. Further, some people may carry both GSM and CDMA (Code Division Multiple Access) mobile phones, for the reason of fee and/or roaming situation. Also, usage of two GSM phones at the same time may also be done due to consideration of fee and/or business contact.

It is necessary to mute a mobile phone on some occasions, such as at a meeting or watching a performance. If a person carries more than one mobile phone, he or she has to mute these phones one by one. Moreover, the muting process varies with difference phones.

Even if the muting process is same for the multiple phones, the one-by-one operation is rather troublesome. Sometimes, one of the phones may be missed, for example, it is left in a bag, leading to unnecessary embarrassment and trouble.

Similarly, it becomes popular to use a notebook computer as a voice communication terminal. As an example, the notebook computer can be utilized to make a SKYPE (one of ultra definite network phone tools) call. Accordingly, the notebook computer enables a ringing act upon the reception of an incoming call. It is thus necessary to mute the notebook computer at a meeting, for example.

Instant communication applications installed on the notebook computer may make a sound for notifying the arrival of a message when it receives an incoming message. In the same way, some networked game machines may make an alarm upon receiving certain information. Some mobile devices can make an alarm at the run-down of battery, whether there is a messaging act or not. Therefore, a muting process is required for all of the above situations.

Association setting is necessary for these devices with sound-making capability on many occasions so as to quickly and easily remove unwanted background sound and noise disturbance. Taking the case of answering a call on one of multiple. devices as an example, without the association setting, the user has to manually mute the rest of the devices one by one, resulting in a hurry-scurry scene. If background sound is not removed in a noisy scenario such as watching TV or playing music, it is difficult to hear the voice on the phone clearly, and the background scenario may be exposed to the other party over the phone. This necessitates a mechanism for automatically muting the devices in the surroundings.

SUMMARY OF THE INVENTION

An object of the present invention is to provide a method and a network terminal for muting a sounder device, which achieves rapid and effective muting processing on the sounder device in the current sound environment.

To achieve the above object, the present invention provides a method for muting a sounder device, comprising Step 1 of binding a network terminal with the sounder device via a network, Step 2 of generating a muting requirement, and Step 3 of sending a muting signal to the sounder device via the network, the muting signal being generated based on the muting requirement, wherein the sounder device is configured to perform a muting process upon the muting signal.

Preferably, the method further comprises a step of sending a recovery signal to the sounder device via the network if the muting requirement is invalid, and the sounder device is configured to recover the state before the muting process upon the recovery signal.

In some embodiments of the method, the sounder device is a mobile phone or a TV set, a stereo set, a networked game machine, a personal computer or a personal digital assistant with network communication capability.

In some embodiments of the method, the network is a personal LAN or a WAN.

In some embodiments of the method, the network terminal is a mobile phone, the step of generating a muting requirement occurs when the mobile phone receives an incoming call or makes an outgoing call, and the muting requirement becomes invalid at the time of rejecting an incoming call or completing a conversation.

In some embodiments of the method, the step of sending a muting signal to the sounder device via the network occurs at the same time that a call-answering key or a call-making key on the mobile phone is pressed. Alternatively, the muting signal is sent by pressing a muting key provided on the mobile phone.

To achieve the above objects, the present invention further provides an apparatus for muting a sounder device, the apparatus comprising a binding module which is bound with the sounder device via a network, a muting signal module which sends a muting signal to the sounder device via the network, upon generation of a muting requirement in the current sound environment, wherein the sounder device is configured to perform a muting process in response to the muting signal.

The apparatus further comprises a recovery signal module which sends a recovery signal to the sounder device via the network if the muting requirement is invalid, and the sounder device is configured to recover the status before the muting process upon the recovery signal.

The apparatus further comprises a muting key connected to the muting signal module for triggering the muting signal module to send the muting signal.

The present invention has the following advantages.

First, the present invention can bind a mobile terminal with one or more sounder devices. If there is a need for removing unwanted background sound, all the bound sounder devices can be controlled via a network to perform a muting process or a volume-lowering process. In this way, the mobile terminal can rapidly and easily. reduce any unwanted background sound at the time of answering a call or making a call. Further, the present invention is applicable to any occasion where there is a need for muting or volume-lowering a number of sounder devices, such as at a meeting or at the entrance of a theater.

DETAILED DESCRIPTION OF PREFERRED EMBODIMENTS

The above objects, advantages and features of the present invention will be apparent from the following detailed description on the preferred embodiments in conjunction with the drawings.

Figure 1:
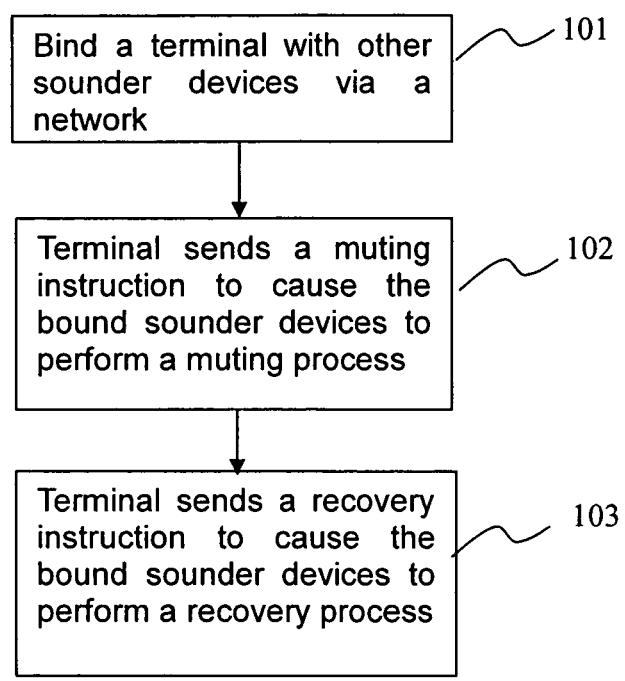
FIG. 1 is a flowchart of steps in the method of the present invention.

The present invention provides a method and apparatus for muting/sound-weakening a bound sounder device. FIG. 1 is flowchart of steps in the method of the present invention. As shown in the figure, the method comprises the following steps.

In step 101, one of a plurality of terminals is bound with the other terminals (sounder devices) via a network, in which the network can be a WAN (Wide Area Network), a PAN (Personal Area Network), a WLAN (Wireless Local Area Network), etc.

In step 102, the terminal sends a muting instruction under a condition of triggering a muting process, wherein the condition includes setting one of these terminals to a muted status, pressing a key and answering a call and/or pressing a call-making key by the user; then the bound sounder devices perform the muting process when they receive the muting instruction. Here, to enable the muting instruction to be accurately identified among the respective terminals bound together, the muting instruction must comply with a common protocol. Alternatively, the muting instruction can be converted by an operator server or a network server so that the respective terminals can correctly identify the instruction.

In step 103, a recovery instruction is sent under the condition of triggering a recovery process, wherein the condition includes setting one of these terminals to a ringing status or hanging up to terminate a conversation by the user; then the bound sounder devices perform the recovery process when they receive the recovery instruction.

Figure 2:
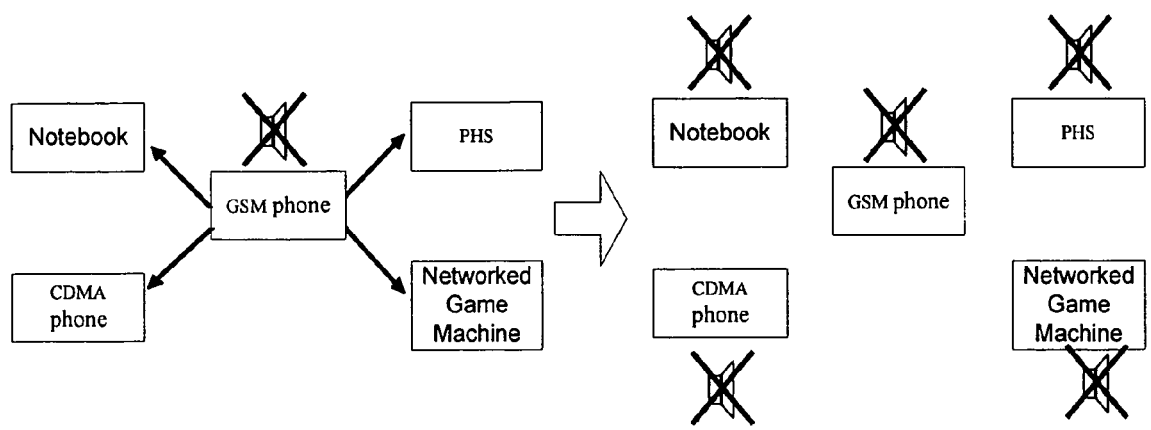
FIG. 2 is a schematic diagram showing a scenario in which the method of the present invention is applicable.

FIG. 2 is a schematic diagram showing a scenario in which the method of the present invention is applicable. As shown in this figure, a mobile phone can be bound with a number of sounder devices, which may be different from each other. Each bound device is controlled via a network to perform a muting process. Specifically, the present invention is applicable in the following scenarios.

1) A handheld phone is bound with an in-vehicle stereo system. In the case of playing music as the car travels, an instruction is sent to the stereo system if an incoming call is received and answered. Then, the stereo system is muted or its volume is lowered to facilitate the call answering, and recovers the previous volume automatically at the end of the call.

2) A handheld phone is bound with a household TV set. In the case of watching TV, a muting instruction is sent to the bound TV set if an incoming call is received and answered and a muting key is pressed at the same time. The TV set performs a muting process, and recovers the sound automatically at the end of the call.

3) A handheld phone is bound with a household stereo system. In the case of making a call, a muting instruction is sent to the stereo system upon press of a call-making key. When the call is finished and the phone is hung up, a recovery instruction is sent to the stereo system, which then recovers its sound automatically.

4) A mobile phone is bound with a plurality of mobile phones and notebook computers in a meeting room. If a muting process is performed on one of the mobile phones, the rest of the mobiles phones and the notebook computers follow the mobile phone to perform a muting process automatically. At the end of the meeting, the ringing function is recovered on one of these phones and computers, and the rest of them recover to the ringing status automatically.

The present invention offers a great advantage that, once bound, all the bound mobile terminals or sounder devices are enabled to perform a muting process correspondingly. They don't need to be muted one by one.

Next, the embodiments of the present invention are specifically described for various scenarios.

First Embodiment

1) The numbers of two handheld phones owned by a single person are registered as being bound with each other at the operator, indicating that the two handheld phones belong to the same person. The binding information is stored in a memory at a server of the operator.

2) One of the two phones performs a muting process as necessary and then sends the result of the muting process to the operator server.

3) Upon reception of the result of the muting process, the server searches for the other bound phone number in the memory and sends a muting instruction to the other handheld phone.

4) The other handheld phone performs a muting process according to the instruction.

Second Embodiment

1) Identity authentication is made between two handheld phones, to indicate that the two phones belong to the same person.

2) One of the two phones performs a muting process as necessary and then sends a muting instruction directly to the other phone.

3) Upon receiving the instruction, the other phone verifies whether the instruction is sent from the authenticated phone number or not, and performs a muting process if yes; otherwise no process is performed.

In each of the above first and second embodiments, information transmission will be charged.

Third Embodiment

1) Two handheld phones belonging to a single person are bound with each other via a PAN.

2) A muting process is performed on one of the phones. The related information is sent to the other phone via the PAN.

3) The other phone performs a muting process immediately upon receiving the information.

Any sounder device within the coverage of the PAN can be bound with the handheld phone. The detailed flow is as follows.

1) A device is bound when entering into the coverage of the PAN.

2) A key for muting certain devices in the ambience is provided in the interface of the handheld phone, in addition to some operation keys such as a call-answering key and a call-rejecting key, when a ringing occurs in response to an incoming call. After the key is pressed, the handheld phone sends a muting instruction to the bound sounder devices via the PAN and then allows the process of call answering.

3) The sounder devices perform a muting process upon receiving the instruction.

4) A recovery instruction is sent to the bound devices upon the completion of the call.

5) The bound devices recover their sound upon receiving the recovery instruction.

The third embodiment requires a connection via the PAN, which enables communication between devices such as a computer, a phone and a personal digital assistance. The coverage of a PAN is typically a few meters in diameter. Maintaining a PAN connection will consume electric power.

In the fourth embodiment, the PAN connection is replaced with a WAN or WLAN data connection, and the rest aspects are the same as in the third embodiment.

Many similar embodiments of the present invention can be provided. For example, all PHS terminals in the same department can be bound with each other. At a department meeting, the department director can mute all the PHS terminals directly or mute any sounder device within the meeting room. Such batch processing provides convenience and rapidness.

As mentioned above, the present invention enables binding between a mobile terminal and sounder devices. When it is necessary to remove unwanted background sound, all the sounder devices can be controlled via a network to perform a muting or volume-lowering process. In this way, the mobile terminal can easily and rapidly have the unwanted background sound be removed or lowered at the time of answering or making a call. Further, the present invention is applicable to any occasion where there is a need for muting or lowering volume of a number of sounder devices, such as at a meeting or at the entrance of a theater.

The foregoing description is only the embodiment of the present invention. Those ordinarily skilled in the art will appreciate that any modification or substitution in the principle of the present invention shall fall into the scope of the present invention defined by the appended claims.

What is claimed is:

1. A method for muting a sounder device, comprising steps of:
   binding said sounder device to a network terminal via a network, said binding including authenticating the network terminal and the sounder device to each other, and indicating that the network terminal and the sounder device belong to one person, the network terminal and the sounder device each being capable of a muting process;
   generating a muting requirement and sending a muting signal to said sounder device via said network, said muting signal being generated based on said muting requirement, said sounder device being configured to perform a muting process in response to said muting signal, wherein the network terminal performs muting processing as necessary and sends a muting instruction directly to the sounder device, which verifies the received instruction is from an authenticated network terminal after receiving the instruction, and if yes, the sounder device performs a muting process, and otherwise, the sounder device performs no process; and
   sending a recovery signal to the sounder device via said network if the muting requirement becomes invalid, the sounder device being configured to recover a status before the muting process upon said recovery signal, wherein the network terminal generates a recovering instruction and sends it directly to the sounder device, which verifies the received instruction is from an authenticated network terminal after receiving the instruction, and if yes, the sounder device performs a recovery process, and otherwise, the sounder device performs no process.

2. The method of claim 1, wherein said sounder device is a mobile phone, a TV set, a stereo set, a networked game machine, a personal computer or a personal digital assistant with network communication capability.

3. The method of claim 1, wherein said network is a Personal Local Area Network or a Wide Area Network.

4. The method of claim 1, wherein said network terminal is a mobile phone, and the step of generating a muting requirement occurs when said mobile phone receives an incoming call or makes an outgoing call.

5. The method of Claim 1, wherein said muting requirement becomes invalid at the time of rejecting an incoming call or completing a conversation.

6. The method of claim 4, wherein the step of sending a muting signal to said sounder device via said network occurs at the same time that a call-answering key or a call-making key on said mobile phone is pressed, or by pressing a muting key provided on said mobile phone.

7. A mobile phone for muting a sounder device, comprising:
   a binding module which is bound with said sounder device via a network, said binding including authenticating a network terminal and the sounder device to each other, and indicating that the network terminal and the sounder device belong to one person, the network terminal and the sounder device each being capable of a muting process;
   a muting signal module which sends a muting signal to the sounder device via said network upon generation of a muting requirement in the current sound environment when said mobile phone received an incoming call or makes an outgoing call, wherein said sounder device is configured to perform a muting process in response to said muting signal, wherein the network terminal performs muting processing as necessary and sends a muting instruction directly to the sounder device, which verifies the received instruction is from an authenticated network terminal after receiving the instruction, and if yes, the sounder device performs a muting process, and otherwise, the sounder device performs no process; and
   a recovery signal module which sends a recovery signal to the sounder device via said network if the muting requirement becomes invalid, said sounder device being configured to recover a status before the muting process upon said recovery signal, wherein the network terminal generates a recovering instruction and sends it directly to the sounder device, which verifies the received instruction is from an authenticated network terminal after receiving the instruction, and if yes, the sounder device performs a recovery process, and otherwise, the sounder device performs no process.

8. The apparatus of claim 7, further comprising a muting key connected to said muting signal module for triggering said muting signal module to send said muting signal.

* * * * *